United States Patent
Neber

(10) Patent No.: US 11,382,170 B1
(45) Date of Patent: *Jul. 5, 2022

(54) BATTERY SELECTOR SYSTEM

(71) Applicant: NODESIMPLE LLC, Miami Beach, FL (US)

(72) Inventor: Matthew Neber, Miami Beach, FL (US)

(73) Assignee: NODESIMPLE LLC, Miami Beach, FL (US)

(*) Notice: Subject to any disclaimer, the term of this patent is extended or adjusted under 35 U.S.C. 154(b) by 200 days.

This patent is subject to a terminal disclaimer.

(21) Appl. No.: 16/939,978

(22) Filed: Jul. 27, 2020

Related U.S. Application Data

(63) Continuation of application No. 16/667,286, filed on Oct. 29, 2019, now Pat. No. 11,129,237.

(51) Int. Cl.
| | |
|---|---|
| *H04W 84/18* | (2009.01) |
| *G08B 21/02* | (2006.01) |
| *G01S 5/02* | (2010.01) |
| *H04W 4/80* | (2018.01) |
| *H04W 64/00* | (2009.01) |
| *H04W 4/029* | (2018.01) |

(52) U.S. Cl.
CPC .............. *H04W 84/18* (2013.01); *G01S 5/02* (2013.01); *G08B 21/0269* (2013.01); *H04W 4/029* (2018.02); *H04W 4/80* (2018.02); *H04W 64/00* (2013.01)

(58) Field of Classification Search
CPC ....... H04W 84/18; H04W 4/029; H04W 4/80; H04W 64/00; G01S 5/02; G08B 21/0269; H01H 27/06; H01H 71/1081; H02J 7/0049; B65H 23/18; H02P 6/28; H01R 13/5224

See application file for complete search history.

(56) References Cited

U.S. PATENT DOCUMENTS

| | | | | |
|---|---|---|---|---|
| 3,152,742 A | * | 10/1964 | Wright ................... | B65H 23/18 226/170 |
| 4,424,424 A | * | 1/1984 | Hollenbeck, Jr. ...... | H01H 27/06 200/571 |
| 10,090,616 B1 | * | 10/2018 | Leimbach .......... | H01R 13/5224 |

(Continued)

FOREIGN PATENT DOCUMENTS

| | | | | |
|---|---|---|---|---|
| EP | 1107274 A1 | * | 6/2001 | ......... H01H 71/0228 |
| JP | 3699491 B2 | * | 9/2005 | |

*Primary Examiner* — Vinncelas Louis
(74) *Attorney, Agent, or Firm* — Albert Bordas, P.A.

(57) ABSTRACT

A battery selector system, which has at least one battery selector having a knob, a core assembly, and a housing. The core assembly has a chassis core cover, a chassis core, a chassis core contact plate, a main printed circuit board, and a secondary printed circuit board. The core assembly further has a wireless microcontroller, which connects to a wireless network. The housing has electrical terminal studs. The knob, the core assembly, and the housing are assembled creating a sealed unit. Each of the electrical terminal studs is connected to a battery, loads, or ground. The at least one battery selector connects through a wireless network, whereby the battery selector coordinates management functions via the wireless network. The at least one battery selector is a physical power controller for distributing loads to a cluster of batteries.

17 Claims, 9 Drawing Sheets

(56) References Cited

U.S. PATENT DOCUMENTS

2010/0127816 A1* 5/2010 Hofmann ........... H01H 71/1081
218/151
2018/0346099 A1* 12/2018 Liu ........................... H02P 6/28
2020/0241379 A1* 7/2020 Barnum ................ H02J 7/0049

* cited by examiner

BATTERY SELECTOR SYSTEM

OTHER RELATED APPLICATIONS

The present application is a continuation-in-part of pending U.S. patent application Ser. No. 16/667,286, filed on Oct. 29, 2019, which is hereby incorporated by reference.

BACKGROUND OF THE INVENTION

Field of the Invention

The present invention relates to battery systems and more particularly to battery selector systems able to distribute loads to a cluster of intelligence batteries.

Description of the Related Art

With the development and usage of various low power, near range signal communication protocols, there has been a rapid growth of devices and systems for monitoring sensors, devices, and systems, and for controlling some of those devices and systems. Most recently, the growth of Internet of Things (IoT) systems for monitoring, controlling, alert notification, system status, and system safety designs has seen tremendous growth and acceptance in both industrial and residential applications.

The designs and specific applicable implementations of such devices are somewhat at its infancy given the continuing and rapid improvements to various sensor technologies, as well as advances in wireless signal communication technology. Residential implementation of such systems for "smart home" applications has been a prime, well-recognized example of usage of such wireless systems in residential security cameras, various "smart home" systems to monitor and control lighting, security systems, garage doors, and many other examples.

There are over 13.0 million recreational boats currently registered in the United States, while the above-mentioned wireless smart technologies have scarcely been implemented for watercraft. One of the reasons is that high-tech electronics and a harsh environment of the sea have a history of maleffect, causing electronics to deteriorate over time. It is therefore that most recreational watercraft operate with technology that was designed in the middle of the twentieth century; mostly manual, or mechanical, and if electric, within individual closed circuits operated by hand. Accordingly, what is needed within the electrical and electromechanical device controller field, is a fully contained, sealed, wireless, customizable, device controller that uses low power, and a near range signal communications protocol that allows users to connect to a plurality of electronic or electromechanical devices for status and control purposes. Such customization should include the ability to modify soft-key metrics of a physical control mechanism. Such a device should also allow for usage in various environments, military, including marine, or saltwater environment, and accordingly would likely require a watertight, sealed device with limited electrical connections.

Applicant is not aware of any system for controlling assets via smart power switching devices having the novel features of the present invention.

SUMMARY OF THE INVENTION

The present invention is a battery selector system comprising at least one battery selector having a knob, a core assembly, and a housing, whereby the at least one battery selector communicates through a self reliant wireless network.

The core assembly comprises a chassis core cover, a chassis core, and a chassis core contact plate. The core assembly further comprises gear motor assemblies, and a shaft, whereby the knob is permanently affixed to the shaft. The core assembly further comprises internal contacts such as a rotation contact having a rotation contact holder, a permanent contact, an isolation contact, and a parallel contact.

The knob and the rotation contact holder are invariably coupled through the shaft, while the gear motor assemblies are variably coupled, whereby the gear motor assemblies are disconnected when a user wants to turn the knob manually.

The core assembly further comprises a main printed circuit board and a secondary printed circuit board, and a hall core. The core assembly further comprises a wireless microcontroller to connect to the wireless network. The core assembly comprises a current sensor and a voltage sensor. The core assembly further comprises one or more bidirectional motors, a bi-directional motor controller, and an angular position sensor. The knob comprises an indicator.

The housing comprises electrical terminal studs, whereby the housing and the core assembly have a parallel taper, whereby when the housing receives the core assembly the internal contacts and internal faces of the terminal studs connect with a contact pressure greater than the normal pressure required.

The electrical terminal studs protrude from the housing outer surface. The housing comprises a mounting surface. The knob, the core assembly, and the housing are assembled creating a sealed unit. The housing receives the core assembly. Each electrical terminal stud is connected to either a battery or loads. The current sensor is positioned between the electrical terminal stud that connect to the battery or load.

The at least one battery selector is installed on marine vessels with one or more mechanical or electromechanical propulsive system, whereby it is required at least one of the battery selector per propulsive unit. The at least one battery selector coordinates management functions via the wireless network. The at least one battery selector is a physical power controller for distributing loads to a cluster of batteries.

It is therefore one of the main objects of the present invention to provide a battery selector system.

It is another object of this invention to provide a battery selector system to monitor power.

It is another object of this invention to provide a battery selector system for automating load distribution.

It is another object of this invention to provide a battery selector system to manage power consumption.

It is another object of this invention to provide a battery selector system with physical and remote controls.

It is another object of this invention to provide a battery selector system, which communicates through a wireless network.

It is another object of this invention to provide a battery selector system, which is of a durable and reliable construction.

It is yet another object of this invention to provide a battery selector system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
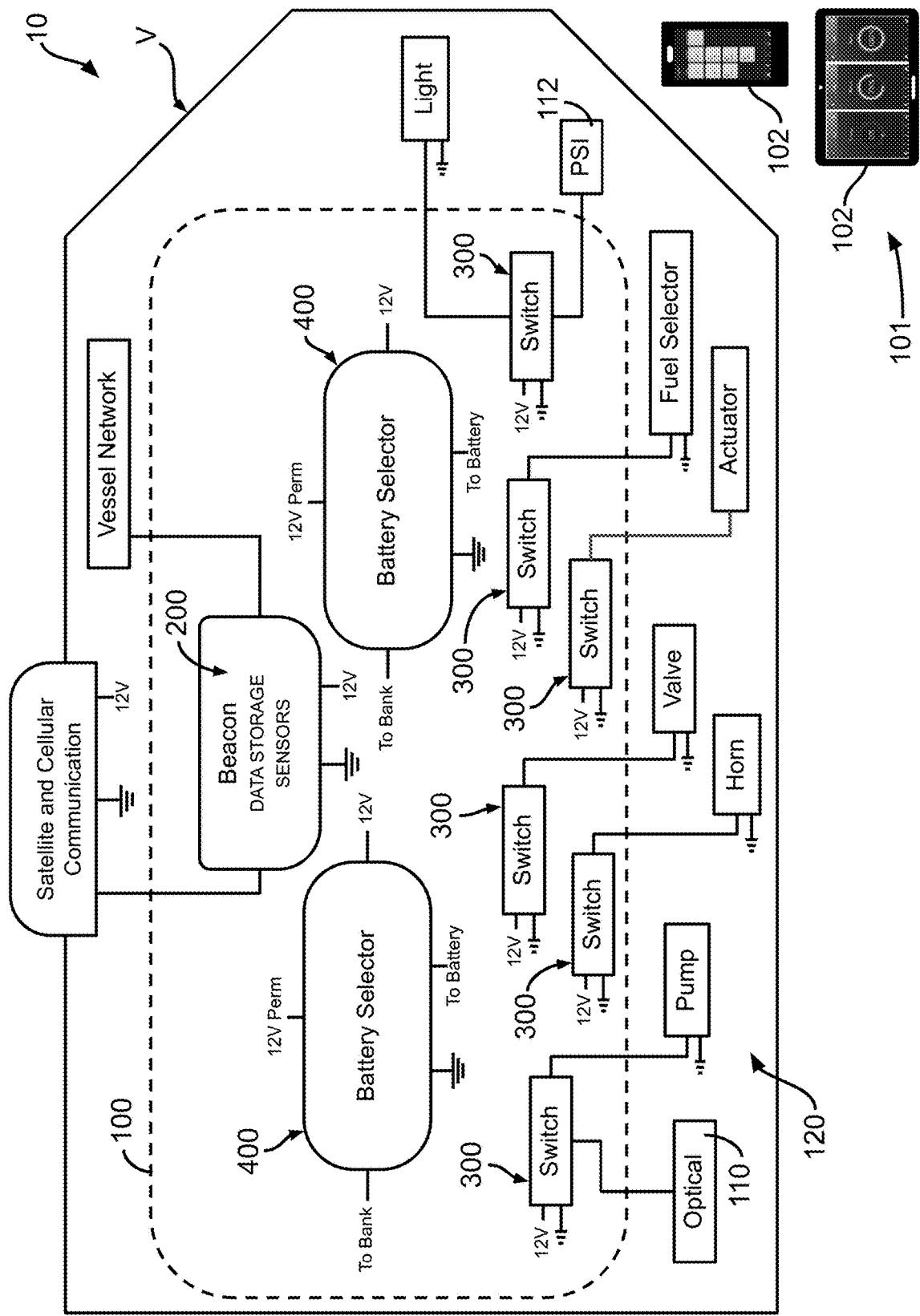
FIG. 1 is a schematic diagram illustrating the present invention as part of a system.

The terms "program", "software application", "mobile application", "application", and the like as used herein, are defined as a sequence of instructions designed for execution on a computer system. A "program", "computer program", "mobile application", "application", or "software application" may include a subroutine, a function, a procedure, an object method, an object implementation, an executable application, an applet, servlet, source code, object code, a shared library/dynamic load library and/or other sequence of instructions designed for execution on a computer system.

The term "GPS location" or "location" should be understood to mean the identification of the real-world geographic location of an object, such as a mobile device or an internet-connected computer terminal and the practice of assessing the location, or to the actual assessed location on planet earth. As a non-limiting example, it also includes using positioning systems to determine a meaningful location (e.g. a street address) including a set of geographic coordinates around the earth.

Term "mobile device" should be understood to mean a handheld computer or a small handheld computing device, typically having a display screen with touch input screen and/or a miniature keyboard. A mobile device as disclosed herein should not be limited to "IPHONE" or "ANDROID" mobile phones or tablet devices.

Term "Wireless" should be understood to mean Wireless communication in the transfer of information or power between two or more points that are not connected by an electrical conductor, and include, but is not limited to: Wi-Fi is a wireless local area network that enables portable computing devices to connect easily with other devices, peripheries, and the Internet; Standardized as IEEE 802.11 a, b, g, n, ac, ax, Wi-Fi has link speeds similar to older standards of wired Ethernet. Wi-Fi; Cellular data service offers coverage within a range of 10-15 miles from the nearest cell site; GSM, CDMA and GPRS, through 3G, to 6G networks such as W-CDMA, EDGE or CDMA2000, and 5G; Low-power wide-area networks (LPWAN) to bridge the gap between Wi-Fi and Cellular for low bitrate Internet of things (IoT) applications; Mobile-satellite communications may be used where other wireless connections are unavailable, such as in the ocean.

Terms "provision", "provisioned", or "provisioning" should be understood to mean the process of authenticating and providing basic information (including unicast addresses and a network key) to a device for it to participate in a network. A device must be provisioned to become part of a network. Once provisioned into a network through a web application or software, a device can transmit or receive messages in the network. A device is provisioned by a "provisioner".

Terms "configure", "configured", or "configuring" should be understood to mean the process by which a device is provided the necessary information for it to perform a function. A device must be configured before it can perform any function. Once configured, a device can perform the function, which it has been assigned. A device is configured by a "provisioner".

A "provisioner" should be understood to mean typically a smartphone or other mobile computing device, running a provisioning application. A provisioner provides an unconfigured device with configuration data. Configuration data is stored in non-volatile memory onboard the device. A provisioner is typically a smartphone or other mobile computing device, running a provisioning application. A provisioner provides the unprovisioned device with provisioning data that allows it to participate in a network.

Terms "programmable", "programmed", or "programming sequence" should be understood to mean capable of being provisioned and configured.

Terms "vessel network" should be understood to mean any existing wired or wireless network within a vessel. This includes NMEA2000 or any adaptation of a Controller Area Network, as well as Ethernet, serial, bus network, or any other similarly defined protocols.

Terms "User Interface", "display console", "console", or "device console" should be understood to mean any visual display that can provide the user with information in either graphical or text format or a combination thereof. It is typically a smartphone or other mobile computing device. Also includes but is not limited to any human machine interface, touch display, panel computer, or similar computing hardware.

Referring now to the drawings, present invention is a battery selector system, also referred as battery selector 400. Battery selector 400 is part of system 10 for controlling assets via smart power switching devices. It can be observed that system 10 basically includes beacon 200, switch 300, and battery selector 400.

As seen in FIG. 1, system 10 comprises at least one beacon 200, and/or at least one switch 300, and/or at least one battery selector 400. The at least one beacon 200, at least one switch 300, and at least one battery selector 400 are collectively called devices. The devices are installed in vessel V, as an example, and operate within wireless network 100. The devices communicate wirelessly with each other and the communication requires no central hub or network management. There is no single point of failure. The wireless network is considered to be self reliant. Wireless network 100 may be a wireless mesh network. Assets 120 are controllable hardware and are also installed in vessel V, but operate external to wireless network 100. Assets 120 also include batteries.

System 10 further comprises User Interface (UI) console 101. In one embodiment, User Interface (UI) console 101 is a user machine interface. In another embodiment, User Interface (UI) console 101 is a computer, such as mobile device 102, that includes mobile phones and tablets. UI console 101 can exist within wireless network 100 within vessel V, and/or within a network from outside vessel V through beacon 200 i.e. while a user is not within the range of wireless network 100 of vessel V. This is one advantage of system 10, whereby the user can connect remotely from anywhere in the world to manage, control, and monitor all devices, and assets 120 that are connected via the devices, within vessel V. UI console 101 can also function as a link from within wireless network 100 to outside vessel V when systems do not include beacon 200. This is one example of a partially redundant and modular design that makes system 10 flexible for users to meet cost-benefit goals. Power controlling devices, such as battery selector 400 and switch 300, communicate within wireless network 100, and assets 120 outside of wireless network 100.

Another advantage of system 10 is that every device is a sensor and has the ability to monitor at least Current (amperes) and Voltage (volts). These functionalities are cornerstone abilities of system 10 that enable the development of meaningful data sets, provide clear real-time pictures of total system diagnostics to the user, and ultimately make intelligent decisions from inferences on processed data.

To accomplish the above, devices within system 10 share data readings with every other device. Since every device can see all other device's data, each can make comparisons, assertions, and ultimately decisions based on that larger data set. Some devices, such as battery selectors 400 and beacon 200 have the ability to keep a history of data from all devices to make more complex decisions. All data can be transmitted to user interface (UI) console 101, which also has the ability to keep a history of the data for the user to monitor and adjust accordingly. In the cloud, conclusions or abnormalities of a data set can be compared to another "normal" data set and an algorithm may draw predictions. Prediction data is then transmitted from cloud to system 10 and user interface (UI) console 101 for users to process and take action. Cloud data may be transmitted to user interface (UI) console 101 either directly or via beacon 200.

Figure 2:
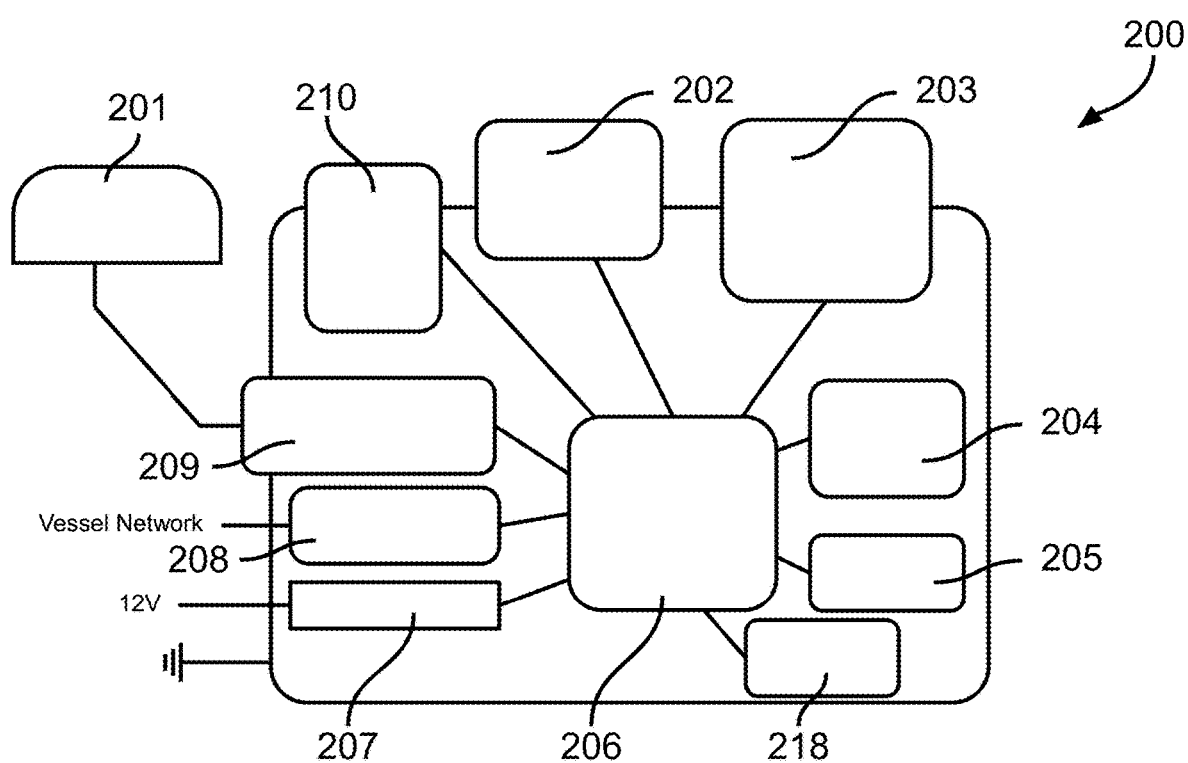
FIG. 2 is a schematic diagram illustrating a beacon with its electronic components.

As seen in FIGS. 1 and 2, in one embodiment, data available to user interface console 101 is transmitted to the cloud directly from beacon 200 via satellite antenna 201, mobile cellular wireless antenna 202, or wireless chip set 210. Such a wireless chip set 210 can be "WIFI" for example. In another embodiment, the data is transmitted to the cloud via user interface (UI) console 101 using cellular or Wi-Fi when beacon 200 is not present in system 10. A "complete" system, one that makes use of all possible system features, is accomplished by including at least one beacon 200, at least one switch 300, and at least one battery selector 400. System 10 is considered modular in that any combination of a subset of these crucial devices will produce a functioning system with a corresponding subset of features. At least one UI Console 101 may be included in the system for enhanced user experience.

By using several devices wirelessly connected together to create a mesh or wireless network 100, system 10 becomes an intelligent System by accomplishing the following steps:
1) monitoring physical properties of assets 120;
2) wirelessly sharing asset 120 data within wireless network 100;
3) storing the data either locally or remotely;
4) comparing the data of assets 120 to either a) other assets 120, b) a stored data set, c) other wireless networks 100, or training data sets; and
5) drawing conclusions to make decisions or assisted decisions.

As seen in FIG. 2, beacon 200 comprises optional satellite antenna 201, an optional mobile cellular wireless antenna 202, low energy chipset 203, flash data storage 204 such as an EEPROM; optional Global Positioning System (GPS) antenna 205, microprocessor or SoM 206, current sensor 207, bus communication networks 208, satellite transceiver 209, Ethernet transceiver 218, and wireless chip set 210. It is noted that low energy chipset 203 can be "BLUETOOTH" for example, and wireless chip set 210 can be Wi-Fi for example.

Mobile cellular wireless antenna 202 may be 3G/4G/5G, LTE, or similar technologies. Bus communication networks 208 are for communication with an existing vessel network, such as NMEA2000. Ethernet transceiver 218 is also for communication with an existing vessel network.

Beacon 200 is an exemplary embodiment of a specific feature set, which includes: network storage needs, gateways to cellular and satellite communication, gateways to existing vessel networks, Wi-Fi connectivity, as well as some basic sensors. In one embodiment, satellite antenna 201 and mobile cellular wireless antenna 202 uplinks can be added in the form of an add-on module (e.g. miniPCIe, M.2, etc.). The Wi-Fi provides local internet connectivity for users if mobile cellular wireless antenna 202 uplink is present in beacon 200, as well as, connectivity to a wide area network WAN (for example provided by a port or marina) for the system to access the internet for cloud connectivity. In conjunction with all other network devices, beacon 200 may be used for security measures: through GPS positioning and/or sensors connected to wireless network 100 via switch 300, seen in FIG. 1, beacon 200 can alert the user of the security state of vessel V. Sensors may be optical sensor 110, pressure sensors 112, as seen in FIG. 1, or a motion sensor.

Figure 2A:
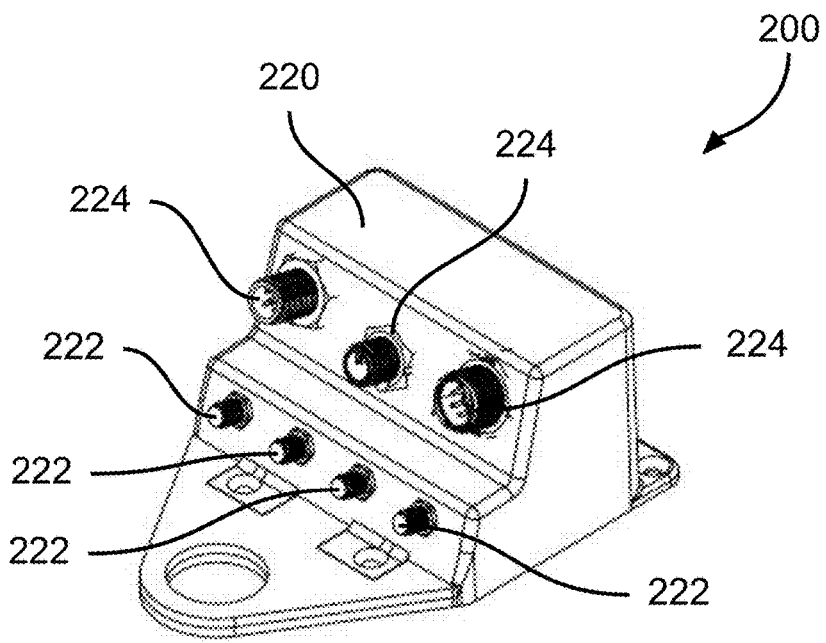
FIG. 2A is an isometric view of the beacon.

As seen in FIG. 2A, beacon 200 comprises housing 220, female connectors 222, and male connectors 224 having one or more unshielded electrical terminals.

Figure 3:
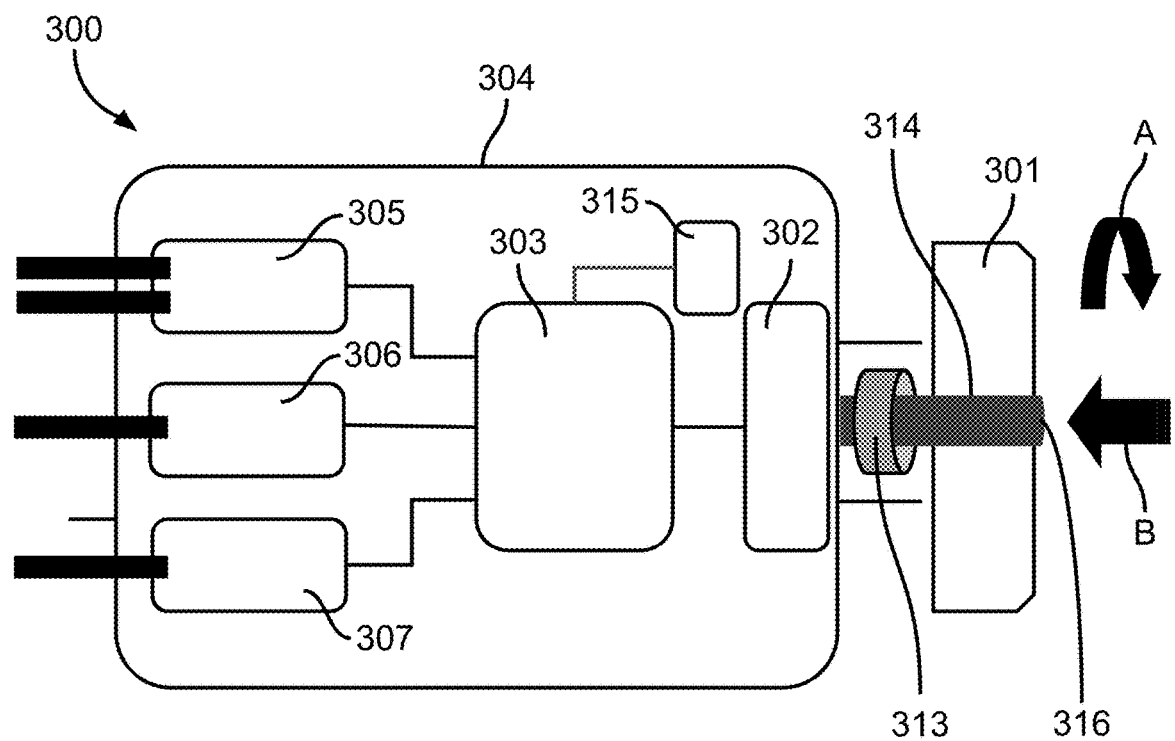
FIG. 3 is a schematic diagram illustrating electronic elements of a switch.

As seen in FIG. 3, switch 300 includes linear and angular position sensors 302, wireless microcontroller 303, waterproof sealed housing 304, at least one Field Effect Transistor (FET) 305, signal sensor 306, current sensor 307, and illuminative indicator 315. Voltage is sensed indirectly or directly from wireless microcontroller 303. Waterproof sealed housing 304 is designed for marine and military applications. External components include a physical user interface (PUI). In a preferred embodiment, the physical user interface (PUI) is rotating knob 301 having rotational movement A, and pressing movement B. External components further include shaft 314, and a set of interchangeable inserts 313 of like size and form.

Switch 300 is an intelligent device, namely, a power-controlling device that can be programmed for a plurality of functions to control any of a plurality of unintelligent assets 120.

In the illustrated embodiment, switch 300 contains rotating knob 301 connected to shaft 314, such that they rotate synchronously. Shaft 314 comprises outer surface 316 at one end and a magnet-encapsulating cavity at an opposite end, not illustrated. Shaft 314 is free to move linearly along its center axis independent of rotating knob 301, such that a pulse of pressure on outer surface 316 is transferred to a tactile click mechanism, not illustrated, producing a tactile click to the user. Shaft 314 is translucent to allow an illuminant indicator LED to shine through a translucent window, not illustrated, from inside waterproof sealed housing 304 to an outside of rotating knob 301. Hence shaft 314, which is a waveguide through a center portion of rotating knob 301, illuminates outer surface 316 visible to the user.

Figure 3A:
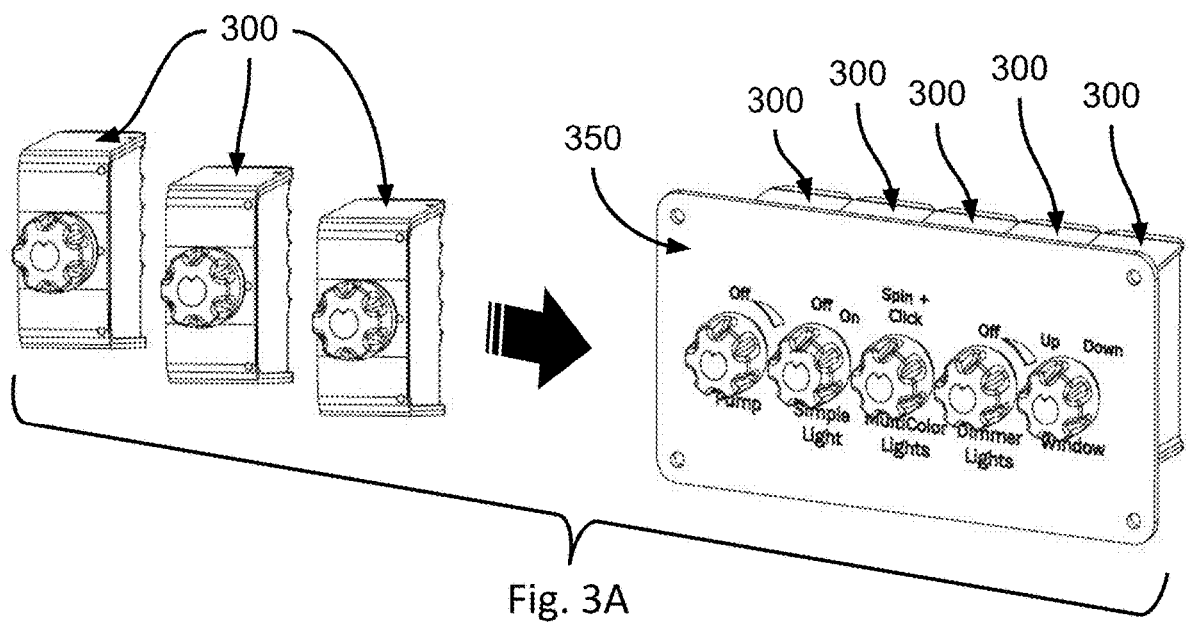
FIG. 3A is an isometric view of a control panel configured with a plurality of switches.

As seen in FIG. 3A, multiple switches 300 are implemented together as part of a complete control panel 350 in a preferred embodiment.

As explained above, one of the advantages of switch 300 is the ability to connect wirelessly, forming a wireless network 100 as seen in FIG. 1, with other switches 300 and battery selector 400 in the network. Other advantages of switch 300 include the ability to share data within wireless network 100 and battery selector 400, and wirelessly transmit to the User Interface console 101 as seen in FIG. 1, for human decision and operation. Battery selector 400 may manage switches 300 to turn off assets 120, which consume too much power when supply is low.

Figure 4:
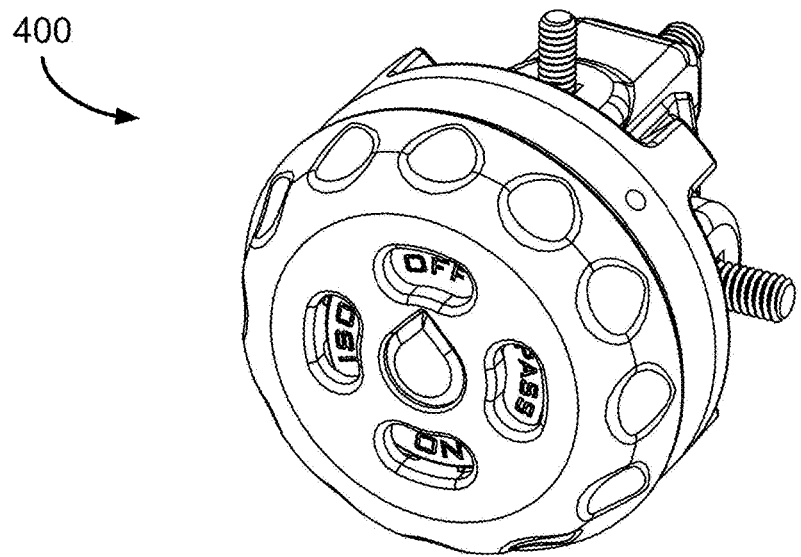
FIG. 4 is an isometric view of a battery selector of the present invention.

As seen in FIG. 4, battery selector 400 is a physical power controller responsible for distributing loads to a cluster of batteries, not shown. Batteries are considered assets of battery selector 400. In a preferred embodiment, there is one battery selector 400 per battery. Many electromechanical systems employ energy storage via batteries. Sometimes multitudes of batteries are used when scaling such systems. Often times it is necessary to parallel two or more batteries for added power capacity, known as creating a power bank or 'banking' for short. It is also sometimes necessary to isolate batteries, or remove from the bank, for power preservation. In a few cases it is even necessary to completely remove a battery from the system and move its loads to another battery. For efficiency and safety, management of all batteries should be done under strict guidelines, and therefore a battery management algorithm is made possible by including these battery selectors 400. This algorithm may be AI (Artificial Intelligence).

Figure 4A:
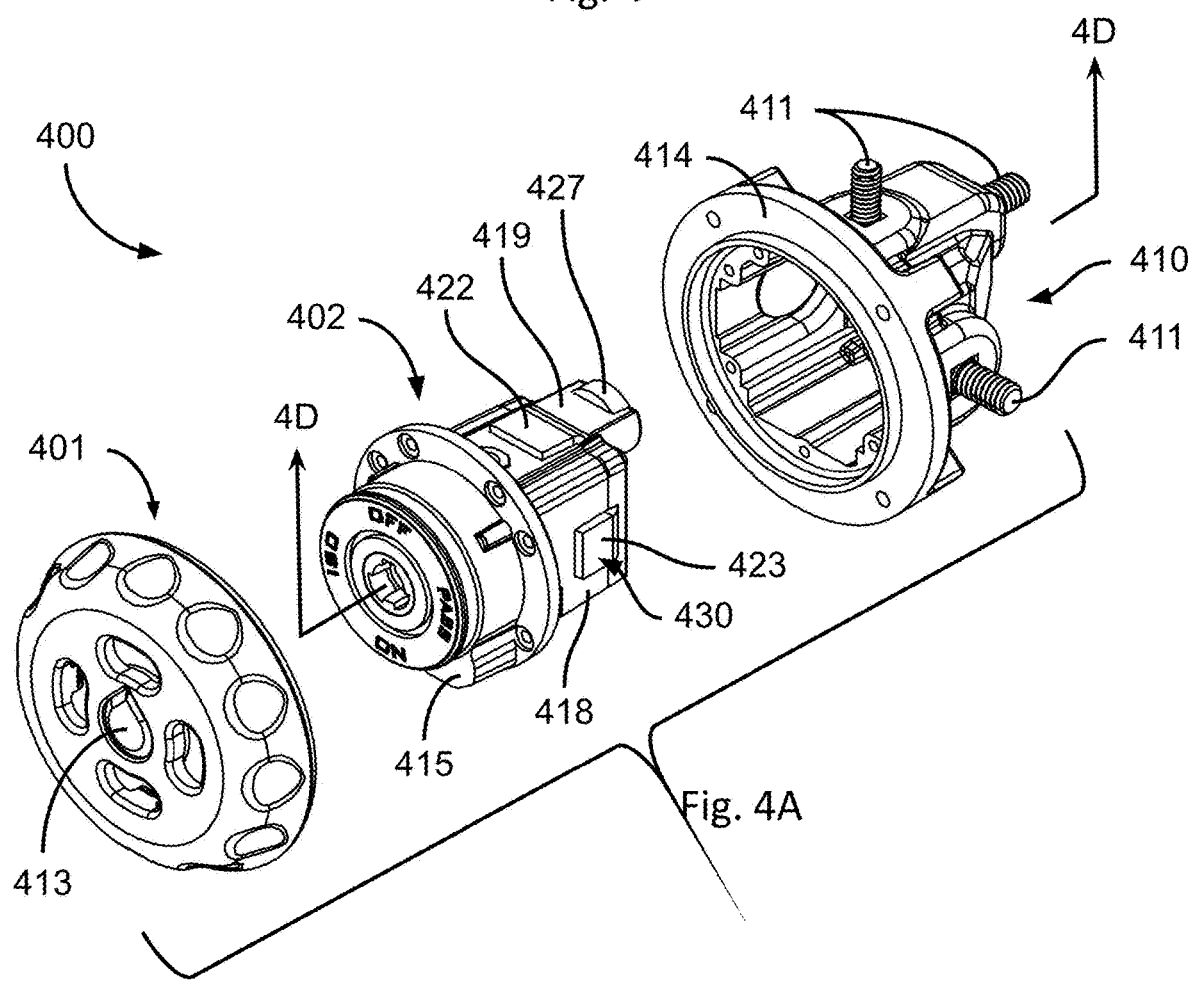
FIG. 4A is an exploded view of the battery selector of the present invention.

As seen in FIG. 4A, battery selector 400 comprises knob 401, core assembly 402, and housing 410. Knob 401, core assembly 402, and housing 410 are assembled together. Knob 401 comprises indicator 413. Knob 401 is typically made of a durable non-conducting material, and is robust enough to be used in any environment for military or marine applications. Knob 401 is for manual override of battery selector 400. Housing 410 is made of hard and durable non-conducting materials, and features sealing ports for electrical terminal studs 411 protruding from within.

Core assembly 402 further comprises internal contacts 430. Housing 410 receives core assembly 402, whereby electrical terminal studs 411 connect with corresponding internal contact 430 sealing an internal cavity. Each electrical terminal stud 411 is connected to a battery, loads, or ground. Battery selector 400 mounts to a panel on mounting surface 414 of housing 410. One of the important advantages is that core assembly 402 is serviceable without housing 410 being removed from mounted electrical panel at mounting surface 414. This is extremely helpful to installers and servicers because of the amount and size of wiring that will be attached to terminal studs 411 of battery selector 400. By first removing knob 401, core assembly 402 is removed to troubleshoot any issues should there be any malfunctions.

Battery selectors 400 work in groups, usually one per battery, to manage an entire cluster of batteries. Knob 401 is operated to the desired mode. Knob 401 is actuated automatically with the option to rotate it manually. Each battery selector 400 has 4 positions or modes labeled as follows: OFF, ON, ISOLATE, and BYPASS. The following are descriptions of the position operand outputs:

Position OFF: battery is disconnected from all loads downstream of the selector and all other batteries. The downstream loads are not connected to power.

Position ISOLATE: battery is connected to its downstream loads and isolated from other batteries.

Position ON: battery is connected to its downstream loads and also any other battery, which is in "ON" position. The downstream loads are supplied by all batteries in "ON" position in parallel.

Position BYPASS: battery is disconnected from all loads, and all other battery selector 400. The downstream loads are supplied power by other batteries in "ON" position. This position should be used when necessary to remove a bad battery.

Each of the four operands above can be applied to a single battery and since the selectors operate together as a group, communicating with each other wirelessly inside wireless network 100, it is possible for intelligent autonomous coordination for safe and efficient battery selector 400 management. An example of such battery selector 400 can be conceived on marine vessel V, seen in FIG. 1, with one or more mechanical or electromechanical propulsive system. Typically, vessel V will require at least one battery selector 400 per propulsive unit and additional load batteries for other onboard systems, which are charged via isolated additional charging leads from the propulsive unit(s).

Figure 4B:
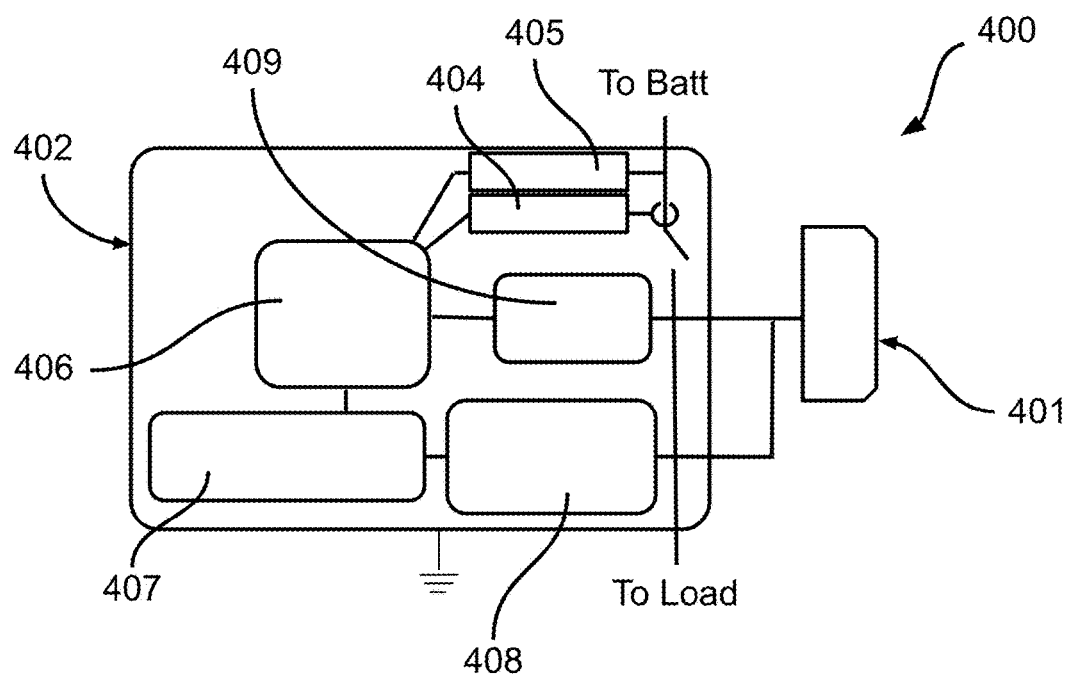
FIG. 4B is a schematic diagram illustrating electronic elements of the battery selector of the present invention.

Seen in FIG. 4B is a schematic diagram illustrating electronic elements of battery selector 400 of system 10. Core assembly 402 comprises angular position sensor 409, one or more bidirectional motors 408, bi-directional motor controller 407, current sensor 404, and voltage sensor 405.

In operation, wireless microcontroller 406 knows the angular position of knob 401 using angular position sensor 409, and according to an algorithm, bi-directional motors 408 rotate knob 401 to a calculated position. Wireless microcontroller 406 connects to wireless network 100.

Figure 4C:
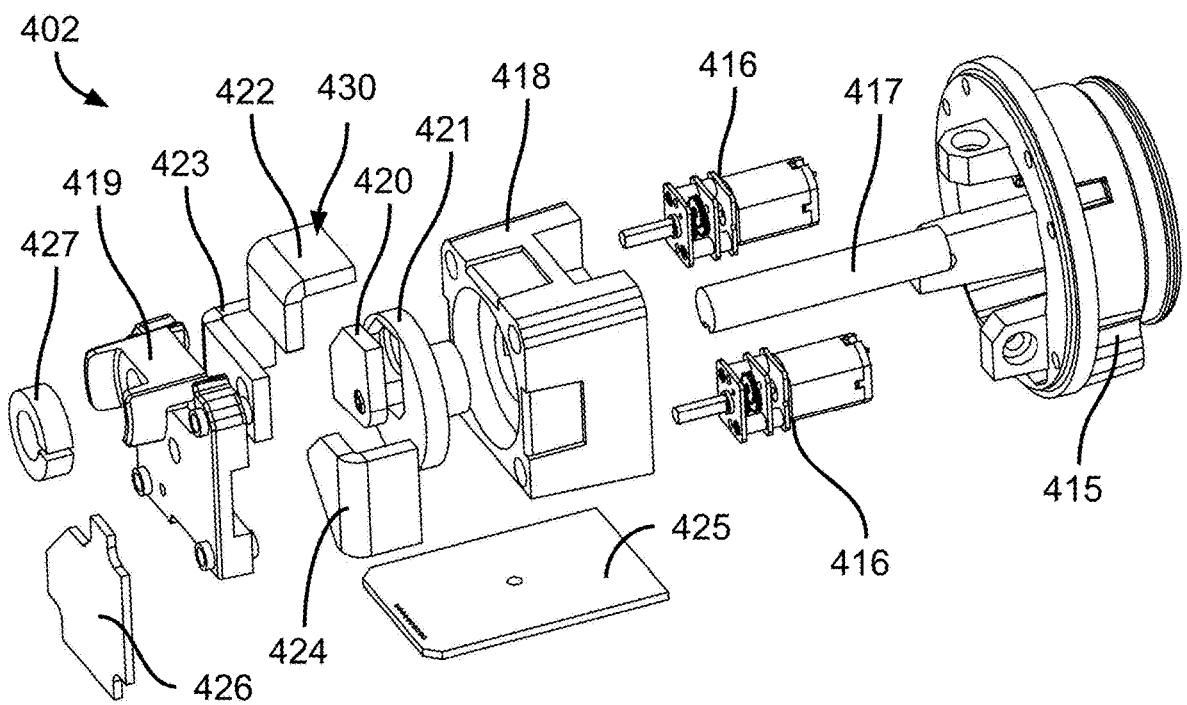
FIG. 4C is an exploded view of a core assembly of the battery selector of the present invention.

As seen in FIG. 4C, core assembly 402 further comprises chassis core cover 415, chassis core 418, and chassis core contact plate 419.

Core assembly 402 further comprises gear motor assemblies 416, shaft 417, and rotation contact holder 421.

Internal contacts 430 comprise rotation contact 420, permanent contact 422, isolation contact 423, and parallel contact 424. Core assembly 402 further comprises main printed circuit board 425, secondary printed circuit board 426, and hall core 427. Hall core 427 may be part of current sensor 404, seen in FIG. 4B, to measure current.

Figure 4D:
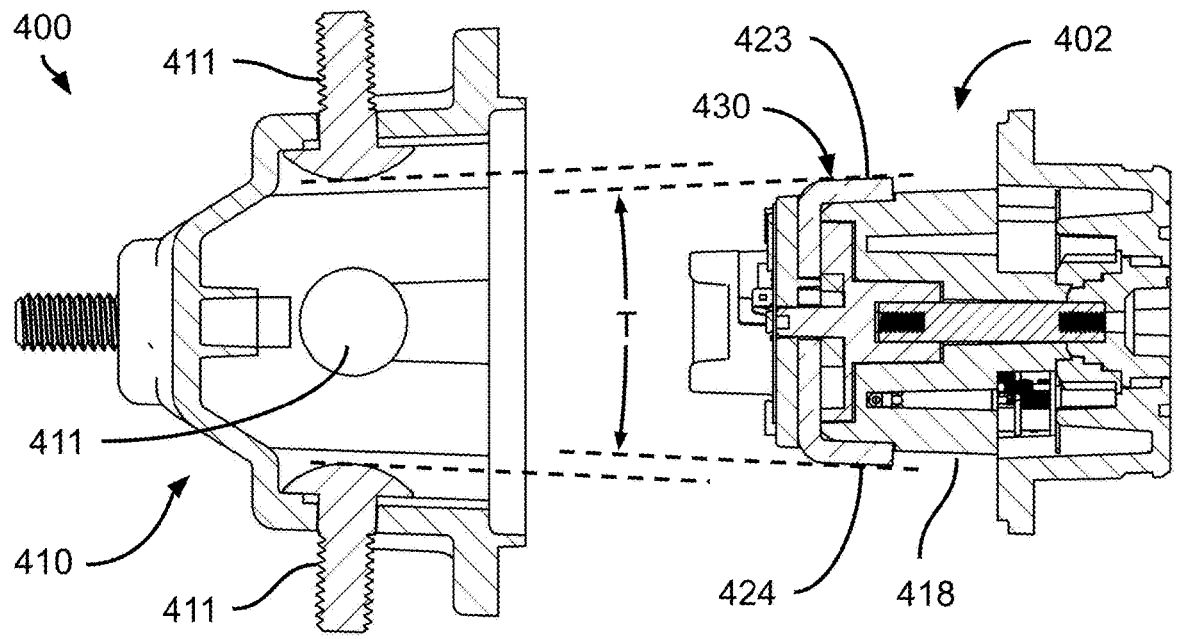
FIG. 4D is a cut view taken along lines 4D-4D from FIG. 4A.

As seen in FIG. 4D, core assembly 402, and housing 410 are telescopically assembled, whereby housing 410 receives core assembly 402. Taper T creates high contact pressure between the mating surfaces of internal contacts 430 and electrical terminal studs 411. Pressure created is many times greater than the pressure needed to insert core assembly 402 into housing 410 and hold in place with fasteners. This is an advantage over existing designs, which has lots of failures because of contact pressure causing housings and fasteners to fail.

Current sensor 404, seen in FIG. 4B, is positioned between electrical terminal studs 411 that connects to a battery and other loads, to ensure that the current sensed is the net current in/out of battery selector 400.

Figure 4E:
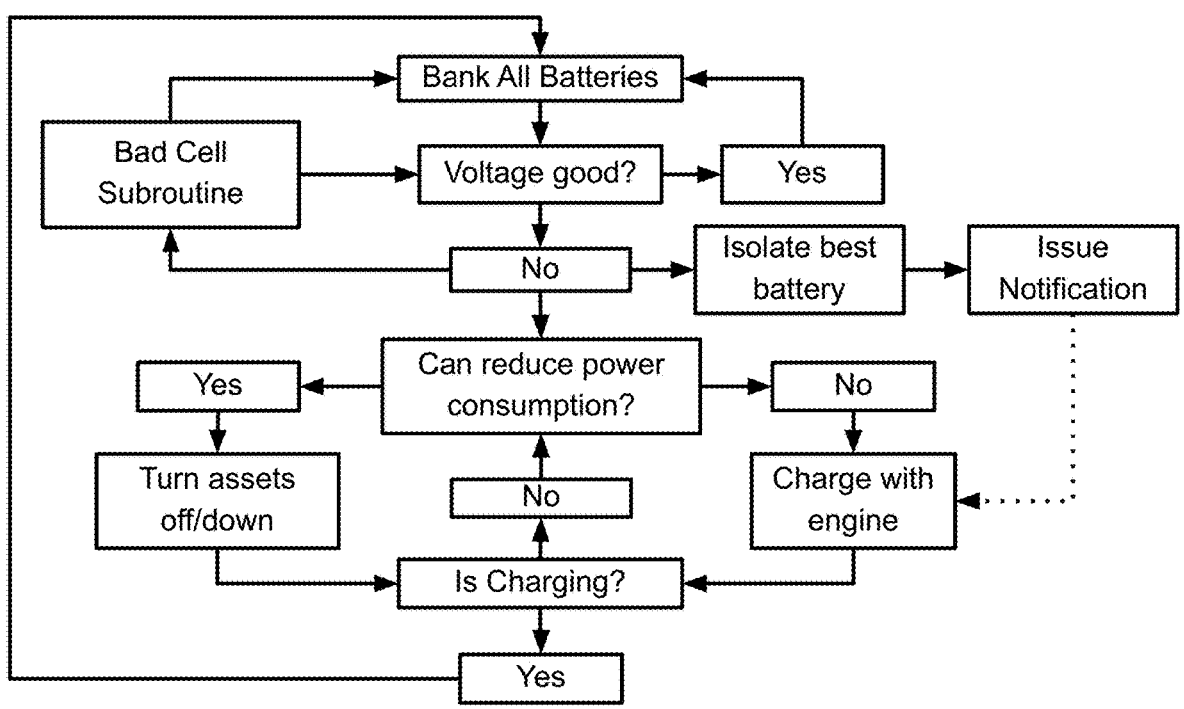
FIG. 4E is a diagram showing an example of one possible algorithm of the battery selector.

As seen in FIG. 4E, battery selector 400 comprises an algorithm stored in wireless microcontroller 406 seen in FIG. 4B. This algorithm manages which batteries to bank, isolate, or disconnect completely, based on many factors including but not limited to battery charge and discharge rates, load draw, voltage levels, and above all else safety. Each selector is capable of monitoring voltage, temperature, and current flows for its asset (battery). All battery selectors 400 coordinate management functions via wireless network 100 seen in FIG. 1. Because battery selector 400 is fully independent and autonomous, user input is not required for battery management. If there is an abnormality the software will warn the user of abnormality and coordinate a group effort of all battery selectors 400 to mitigate said abnormality according to the four operands mentioned above.

In another embodiment, each battery selector 400 should be capable of storing events in a memory akin to a redundant array of independent disks (RAID). Battery selectors 400 can remain functional in a low level sleep, minimum power draw, to monitor and store or report events such as charging status, bilge alarms, high water alarms, etc. They may also be the central storage point for events and data from other devices, switches 300, for any period of time where no beacon 200 or UI console 101 is present in the system as seen in FIG. 1.

Figure 5:
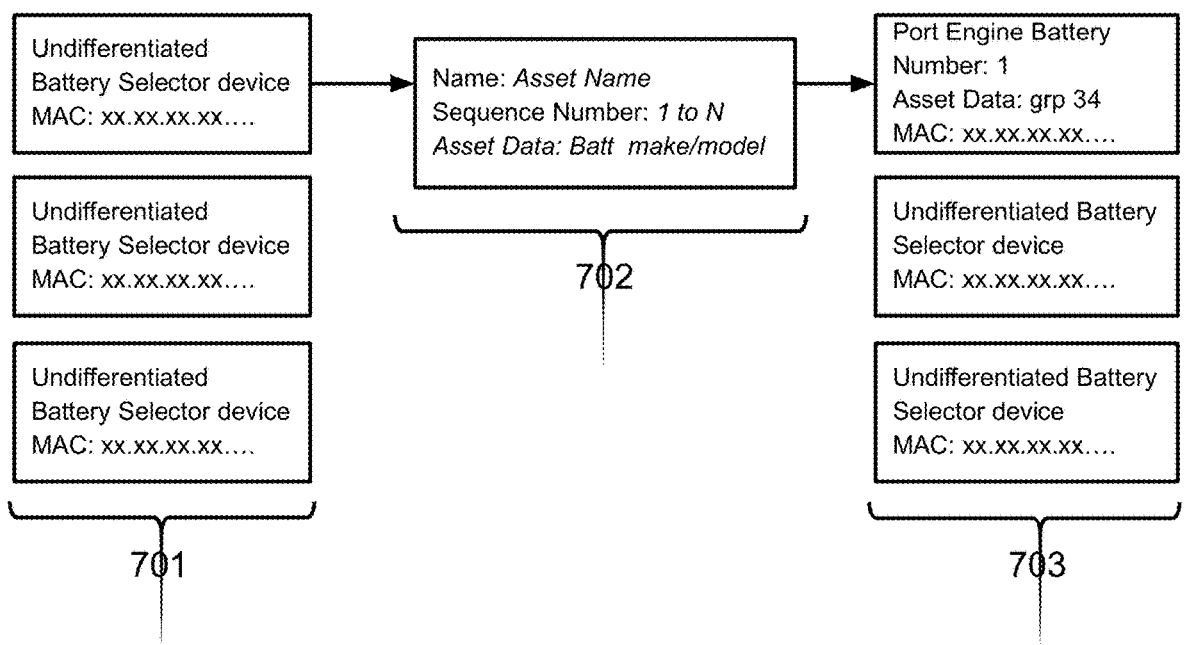
FIG. 5 is a diagram showing a process to configure a battery as an asset inside a wireless network of the system.

Seen in FIG. 5 is a diagram showing programming process 700, to configure assets for different user-defined functions inside wireless network 100 of system 10 seen in FIG. 1. The process to configure assets for different user-defined functions defines a functionality of each device and the identity of that device's asset. Configuration is required to program devices to their required function since devices are capable of becoming a multitude of user-selectable, functionalities. In practice, this procedure is analogous to stem cells undifferentiated cells are homologous until their specific function is defined. This process may take place within User Interface console 101 seen in FIG. 1. A Graphical User Interface described below is designed to streamline processes. Compared to other systems, the configuration process is much simpler since each device ultimately has only a single asset-defined purpose. Provided herein is a step-by-step description of the process.

Figure 6:
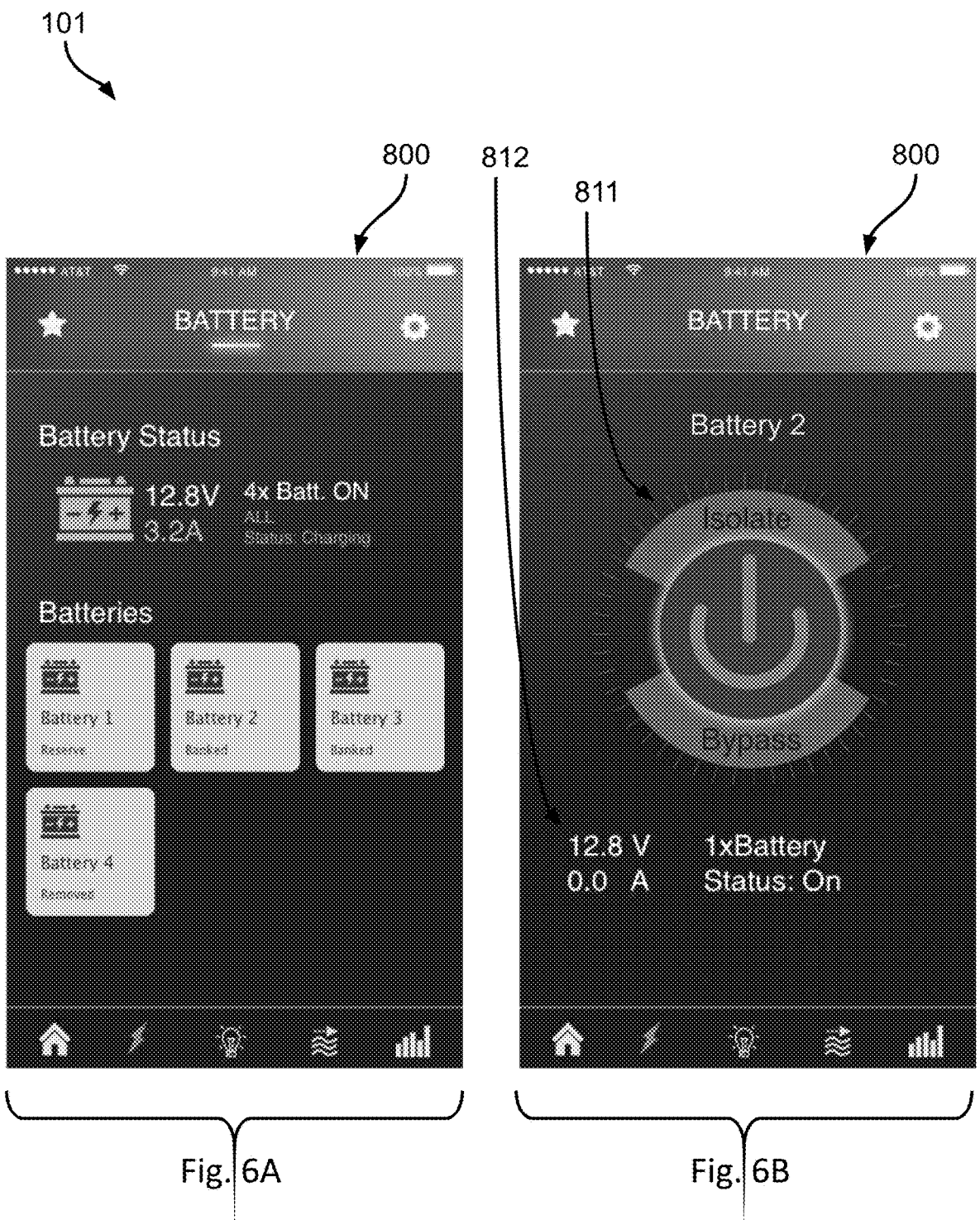
FIG. 6A is a graphical user interface for the battery selector.
FIG. 6B is a graphical user interface for a battery.

The steps of the process of the programing sequence can be described as follows:

Step 1) a user selects an un-configured device 701 for configuration and provisioning into wireless network 100, seen in FIG. 1;

Step 2) the selected device identifies itself by some means such as blinking an indicator or moving, in certain patterns;

Step 3) the user fills in required fields to completely describe asset 120 identity and device function as illustrated in column 702 as step 3;

Step 4) the inputted information, configuration information, and security keys to access and participate in wireless network 100 seen in FIG. 1, provisioning information is saved in persistent storage onboard the device;

Step 5) an identity and function has been defined and is reflected in the list as a configured device, illustrated by the example column 703 as step 5; and Step 6) the devices, switch 300, battery selector 400, in column 703 as step 5 each have a specific GUI graphical element 811, seen in FIG. 6B as an example, automatically generated based on their identity and function and added to an appropriate position of an appropriate section within Graphical User Interfaces 800 as seen in FIGS. 6A and 6B.

As seen in FIGS. 6A and 6B, Graphical User Interface 800 is an application running on user interface console 101. In the illustrated embodiment, Graphical User Interface 800 works with battery selector 400 for controlling batteries, indicating the status of each battery in the system. It is a requirement of graphical elements 811 to reflect battery status 812. GUI graphical elements 811 indicate that a battery is "On" by illuminating a graphic contained within graphical element 811.

User interface console 101 is sufficient for provisioning, adding devices to wireless network 100, seen in FIG. 1, and configuration, assigning each device name, function, asset type, etc. In another embodiment, Graphical User Interface 800 software is included on navigation systems of vessels V, seen in FIG. 1, for console control of the system devices.

Figure 7:
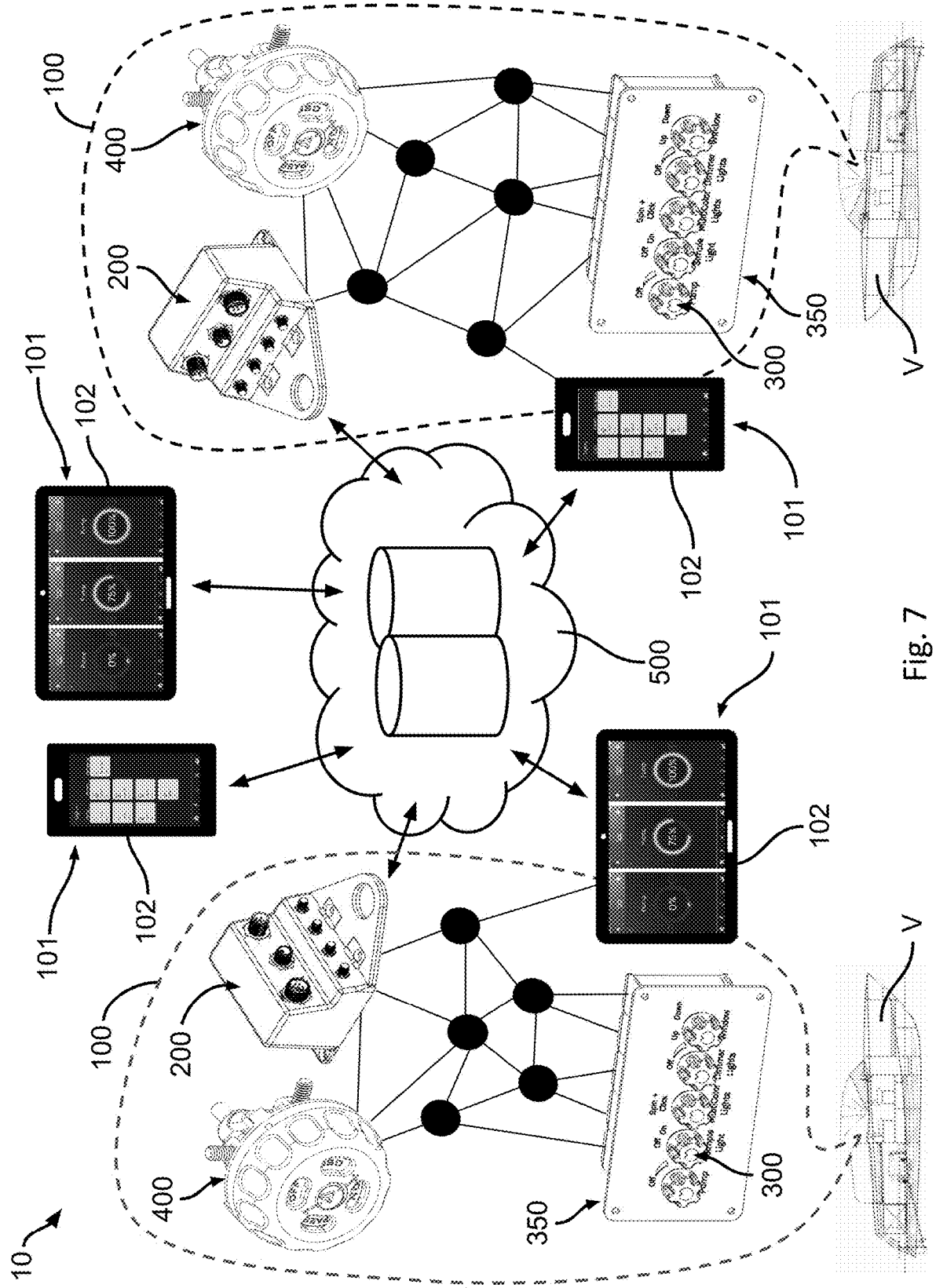
FIG. 7 is a diagram showing a smart system that allows switches and battery selectors to communicate with a cloud server and mobile devices inside and outside of the wireless network.

Seen in FIG. 7 is a schematic representation of wireless network 100 made up of at least one beacon 200, at least one control panel 350 having switches 300, at least one battery selector 400, and at least one mobile device 102 within vessel V. Details of data flow between wireless network 100 in vessel V, and remote User interface consoles 101 that comprise a complete system 10 are described herein.

Beacon 200 and mobile device 102 are capable of transmitting data from within wireless network 100 to cloud server 500. Mobile device 102 is capable of acting as an uplink between their respective wireless network 100 and cloud server 500 if no beacon 200 is present on wireless network 100. Both beacon 200 and mobile devices 102 are capable of storing data until an uplink to cloud server 500 can be made, bad signal, in a method commonly known as cache-and-push. Control and monitoring, as well as, device provisioning and configuration, can be administered from local mobile device 102 or from any remote user interface console 101 or a second mobile device 102 via cloud server 500.

Control panels 350 having switches 300, and battery selectors 400, within their respective vessel V carry a limited amount of intelligence, primarily machine learning and anomaly detection subsets of artificial intelligence. Server-side computing that may include Artificial Intelligence by cloud server 500 can perform extremely complex operations with collected data. Further, an ability to process large data sets from many vessels and many networks that implement this system enables the ability to draw broader conclusions, relating to predictive analytics for example. Cloud server 500 is then capable of communicating any alerts back to the user either directly to mobile devices 102 or to wireless network 100 via beacons 200.

Switches 300 and battery selectors 400 are responsible for monitoring, logging, sharing, and reporting anomalies with their assets 120, the machine learning subsets of artificial intelligence. Within wireless networks 100 the user is notified of any anomalies. The anomalies are also transmitted to cloud server 500 to be logged and stored. Server-side computing will process, as described above, data for multitudes of vessels V that are using the same or similar devices. In this way more comprehensive data sets are built making the systems analytics more reliable with time.

In a preferred embodiment, intelligent system of system 10, comprises the following steps:

1) collecting data from a multitude of assets 120 and other sensors within vessel V, by a plurality of switches 300, and battery selectors 400;

2) sharing the data collected from switches 300, and battery selectors 400 with one another such that all devices share all data;

3) transferring the data to at least one cloud server 500 for storage and computing such as comparisons, assertions, predictions, and decisions; and 4) allowing user interface console 101 to communicate with the at least one cloud server 500 to show the user the comparisons, assertions, predictions, and decisions based on the shared data.

System 10 allows users to customize and connect to a plurality of electronic or electromechanical apparatus for status and control purposes. Such a device should allow for usage in various environments, including marine, or saltwater environment, and accordingly would likely require a watertight, sealed device with limited electrical connections. A system is built by adding devices to a closed local network to provide a user with the ability to easily communicate with any devices in wireless network 100. Devices can communicate amongst themselves within the network to share data, which is used for devices to perform tasks in response to events.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A battery selector system comprising at least one battery selector having a knob, a core assembly, and a housing, whereby said at least one battery selector communicates through a self-reliant wireless network, said core assembly comprises internal contacts as a rotation contact having a rotation contact holder, a permanent contact, an isolation contact, and a parallel contact, said core assembly further comprises gear motor assemblies, and a shaft, whereby said knob is permanently affixed to said shaft, said knob and said rotation contact holder are invariably coupled through said shaft, while said gear motor assemblies are variably coupled to said shaft, whereby said gear motor assemblies are disconnected when a user wants to turn said knob manually.

2. The battery selector system set forth in claim 1, further characterized in that said core assembly further comprises a chassis core cover, a chassis core, and a chassis core contact plate.

3. The battery selector system set forth in claim 1, further characterized in that said core assembly further comprises a main printed circuit board and a secondary printed circuit board, and a hall core.

4. The battery selector system set forth in claim 1, further characterized in that said core assembly further comprises a wireless microcontroller to connect to said wireless network.

5. The battery selector system set forth in claim 1, further characterized in that said core assembly comprises a current sensor and a voltage sensor.

6. The battery selector system set forth in claim 5, further characterized in that said housing comprises electrical terminal studs, whereby said housing and said core assembly have a parallel taper, whereby when said housing receives said core assembly said internal contacts and internal faces of said terminal studs connects with a contact pressure greater than a normal pressure required.

7. The battery selector system set forth in claim 6, further characterized in that said electrical terminal studs protrude from said housing outer surface.

8. The battery selector system set forth in claim 6, further characterized in that each of said electrical terminal studs are connected to either a battery or loads.

9. The battery selector system set forth in claim 8, further characterized in that said current sensor is located between said electrical terminal studs that connect said battery to said loads.

10. The battery selector system set forth in claim 1, further characterized in that said core assembly further comprises one or more bidirectional motors, a bi-directional motor controller, and an angular position sensor.

11. The battery selector system set forth in claim 1, further characterized in that said knob comprises an indicator.

12. The battery selector system set forth in claim 1, further characterized in that said housing receives said core assembly.

13. The battery selector system set forth in claim 12, further characterized in that said knob, said core assembly, and said housing are assembled creating a sealed unit.

14. The battery selector system set forth in claim 1, further characterized in that said housing comprises a mounting surface.

15. The battery selector system set forth in claim 1, further characterized in that said at least one battery selector is installed on marine vessels with one or more mechanical or electromechanical propulsive system, whereby it is required at least one of said battery selector per propulsive unit.

16. The battery selector system set forth in claim 1, further characterized in that said at least one battery selector coordinates management functions via said wireless network.

17. The battery selector system set forth in claim 1, further characterized in that said at least one battery selector is a physical power controller for distributing loads to a cluster of batteries.

* * * * *